US012591588B2

(12) United States Patent
Ross

(10) Patent No.: US 12,591,588 B2
(45) Date of Patent: Mar. 31, 2026

(54) CATEGORICAL SEARCH USING VISUAL CUES AND HEURISTICS

(71) Applicant: Michael M. Ross, Providence, RI (US)

(72) Inventor: Michael M. Ross, Providence, RI (US)

( * ) Notice: Subject to any disclaimer, the term of this patent is extended or adjusted under 35 U.S.C. 154(b) by 294 days.

(21) Appl. No.: 17/113,197

(22) Filed: Dec. 7, 2020

(65) Prior Publication Data

US 2021/0173850 A1 Jun. 10, 2021

(51) Int. Cl.
*G06F 16/26* (2019.01)
*G06F 16/242* (2019.01)

(52) U.S. Cl.
CPC .......... *G06F 16/26* (2019.01); *G06F 16/2428* (2019.01)

(58) Field of Classification Search
CPC .. G06F 16/26; G06F 16/2428; G06F 16/9032; G06F 17/30
See application file for complete search history.

(56) References Cited

U.S. PATENT DOCUMENTS

| | | | | |
|---|---|---|---|---|
| 6,658,404 | B1 * | 12/2003 | Cecchini | G06F 16/3329 |
| | | | | 707/758 |
| 10,747,757 | B1 * | 8/2020 | Puvvada | G06F 3/0483 |
| 2005/0144162 | A1 * | 6/2005 | Liang | G06F 16/338 |
| 2007/0027851 | A1 * | 2/2007 | Kruy | G06F 16/2428 |
| 2011/0219352 | A1 * | 9/2011 | Majumder | G06F 30/39 |
| | | | | 716/139 |

| | | | | |
|---|---|---|---|---|
| 2012/0221553 | A1 * | 8/2012 | Wittmer | G06F 16/904 |
| | | | | 707/E17.014 |
| 2014/0115527 | A1 * | 4/2014 | Pepper | G06F 16/338 |
| | | | | 715/781 |
| 2015/0317320 | A1 * | 11/2015 | Miller | G06F 16/90324 |
| | | | | 707/728 |
| 2016/0063112 | A1 * | 3/2016 | Bottum | G06F 16/9535 |
| | | | | 707/723 |
| 2018/0024731 | A1 * | 1/2018 | Sanches | G06F 8/38 |
| | | | | 715/763 |
| 2018/0314695 | A1 * | 11/2018 | Prouzet | G06F 16/93 |
| 2019/0108172 | A1 * | 4/2019 | Boland | G06F 16/252 |
| 2019/0179947 | A1 * | 6/2019 | O'Brien | G06F 16/2428 |
| 2019/0220548 | A1 * | 7/2019 | Kirkham | G06F 16/164 |
| 2020/0097481 | A1 * | 3/2020 | Cosentino | G06F 16/24575 |
| 2020/0342029 | A1 * | 10/2020 | Piecko | G06F 16/9035 |

OTHER PUBLICATIONS

Nick Babich; "Design a Perfect Search Box," Feb. 28, 2017, babich.biz, pp. 1-9.

(Continued)

*Primary Examiner* — Ann J Lo
*Assistant Examiner* — Fernando M Mari Valcarcel
(74) *Attorney, Agent, or Firm* — Michael D. Eisenberg

(57) ABSTRACT

A graphical user interface with visual categories having a logical relationship for defining search queries for internet search engines or other search applications and devices. Users can input search words, phrases, or other data that apply to the interface categories. A visual metaphor for categories of logical operators, search operators, and search parameters assists users and facilitates generating syntactically optimized search queries. There is also the capability for users to use the interface to specify the relative importance and proximity of words, phrases, or other data. Searches can be filtered, focused, iterative, and persistent.

13 Claims, 12 Drawing Sheets

(56)                    References Cited

OTHER PUBLICATIONS

Gyorgy Fekete, "Designing the Holy Search Box: Examples of Best Practices," Dec. 2008, Smashing Magazine, pp. 1-21.
Ebsco Industries, Inc., "Searching for the Boolean Operators," 2020, Ebsco.com, pp. 1-4.
Google, Advanced Search, pp. 1.
Sam Dutton; "How to Build a Great Search Box," Sep. 17, 2018, Medium.com/@samdutton, pp. 1-25.
IEEE Conference Publication—ieeexplore.ieee.org; "A New Graphical Interface for Web Search Engine," Jun. 25-27, 2007, pp. 1-2.
NordiCHI '08: Proceedings of the 5th Nordic conference on Human-computer interaction: building bridges, "Improving web search transparency by using a Venn diagram interface ," Oct. 2008, pp. 249-256; https://doi.org/10.1145/1463160.1463187.
Andrey Poteryahin, "Open Flutter Project: Product Filters in E-commerce App," Feb. 1, 2020, Medium.com, pp. 1-3.
Ebsco Host Visual Search, "Search Suggestions with Interactive Visualizations," 2006.
Ux.stackexchange.com, "Info Visulatiosation-Intuitive Interface for Comprising Boolean Logic?" 2010, pp. 1-25.
Theresa Neil, "UI Patterns for Mobile Apps: Search, Sort and Filter," Apr. 2012, Smashing Magazine, pp. 1-35.
M5 Visual Search, mlasolutions.com, pp. 1-2.
John W. Burns, "Visualizing Keyword Searches using the Venn Diagram," May 2015, Journal of Advances in Information Technology, vol. 6, No. 2, pp. 67-70.
Youtube Advanced Filter, pp. 1.

* cited by examiner

300

600

700

800

801

802

CATEGORICAL SEARCH USING VISUAL CUES AND HEURISTICS

FIELD OF INVENTION

This disclosure relates generally to user interfaces for managing information on a computing device.

BACKGROUND OF INVENTION

Users may perceive web searches, such as Google and Bing searches, to be merely typing into an input field or saying a few words that describe what they are looking for. Users may not be aware of the utility of categorizing search words, phrases, or other data according to logical operators, search operators, and search parameters, as well as setting other search criteria that can focus or filter data. A visual, nonlinear interface can allow users to use and appreciate the value of this approach in obtaining the search results they seek.

Modern web search interfaces typically provide the user with a single field to enter a search. (In addition to Google and Bing, this is also the case for DuckDuckGo, Baidu, Yandex, StartPage, Ecosia, as well as Twitter and YouTube). Seldom seen "advanced search" pages are difficult to use, having a confusing array of many fields and other unintuitive options.

The present invention remedies this by providing a visually enhanced, nonlinear user interface, which enables categorical-unambiguously explicit and direct-data entry. Its visual categories correspond with the components and rules of a syntactically correct search. Such generated search instructions can be targeted to the internet, an intranet, an extranet, or another searchable data source.

In the prevailing single-field search, users typically omit punctuation and enter words in an arbitrary order or in the form of question. In any case, the relationship of the words to each other does not in many cases signify the intent of the user.

Some current search engines partially ameliorate this by caching user search data and applying AI, machine learning, or other algorithms to better interpret user intent. However, this requires tracking user behavior over time using their account data to identify the user.

The user is not in control, and this feature does not empower the user to search with more sophistication.

In contrast to single-field text entry, the present invention may help users "unpack" the search process by enabling categorical or otherwise improved searches using visual cues and heuristics that users can readily grasp in order to generate syntactically correct search instructions.

The term "search" in the context of this present invention is used in a nontechnical sense to refer to the search text sent to a web search engine, as opposed to, for example, a database query.

SUMMARY OF INVENTION

The present invention provides a graphical user interface that enables a user to take advantage of visual cues and other heuristics (or learning aids) to perform an effective search using "categories" that define relationships for "terms" that are words or phrases or other data representable as text. The categories associate terms with logical operators, search operators, or search parameters, and in some cases none of these.

In one embodiment of the present invention the method comprises a computer-implemented graphical user interface, the interface divided into delineated areas; wherein each area is identified by some graphical means, such as a label or an icon or some other graphical element, that indicates a category; wherein said category or categories are associated with one or more logical operators or search operators or search parameters or with none of these; wherein said categories represent such search-related actions as including terms, excluding terms, choosing one or the other terms, and choosing one term but not excluding the other term; wherein the user enters terms that are words, phrases, or other data into text input areas of said categories, and said terms are displayed with or without containing shapes or boundaries; wherein the user enters some choice, value, or some other data attribute for search parameters if such parameters are in said interface; wherein the user drags and drops or otherwise moves said terms from one category to another category or into an area that is not a category; and wherein the user's input is assembled as the output for a syntactically correct search by using said operators and said search parameters applied to said terms.

In a preferred embodiment, there is a method wherein the system uses an interchangeable set of symbols and syntax rules if the search requires a different set of said symbols and said syntax rules as applied to said terms. In a further embodiment, there is a method wherein the system converts input for data manipulation and storage and converts back the output as the search and for restoring the interface representation of a previously saved search. In a further preferred embodiment, there is a method wherein the user selects a set of shapes including but not limited to quadrants, spheres or circles, and expandable/collapsible lists. In a further preferred embodiment, there is a method wherein said interface optionally provides means for the user to select from a collection of searchable information what information is restricted or expanded in the search by: excluding or including a source of information; excluding or including a category of information. In a further preferred embodiment, there is a method wherein once a search is executed the user changes, as desired, the user-entered terms and their said logical operators, search operators, search parameters, and excluded and included sources and categories of information. In a further preferred embodiment, there is a method wherein the system persists the user-entered terms and said logical operators, search operators, search parameters, and excluded and included sources and categories of information, as applicable, in a storage medium according to what has been input or selected by the user. In a further preferred embodiment, there is a method wherein the system uses a search engine or other device to execute the search in real time or by explicitly applying the search from said interface or from the search engine itself or other device after generating the search. In a further embodiment, there is a method wherein there is an option to show the results of the search-engine-executed search appended to said interface. In a furthermore preferred embodiment, there is a method wherein the user retrieves persisted searches, repeats said searches, makes changes to said searches, and resaves said searches as new searches.

In another embodiment of the present invention the system comprises a computer-implemented graphical user interface, the interface having a visual representation of categories with a logical relationship in which a user enters terms wherein said terms are words, phrases, or other data; a display of categories as visually delineated input areas or other areas in the interface in which some or every area corresponds with a search; wherein said instructions are logical operators or search operators or search parameters, said parameters being able to accept a value or some other data attribute; wherein said interface offers more than one selectable graphical representation of categories in which the user inputs said terms into said input areas; wherein terms are selectable and moveable by the user to another said area or to remove the terms from any said area; and wherein the system assembles the user's input using said operators and said search parameters applied to said terms to output a syntactically correct search.

In a preferred embodiment, there is a system wherein the system uses an interchangeable set of symbols and syntax rules if the search requires a different set of said symbols and said syntax rules as applied to said terms. In a further preferred embodiment, there is a system wherein the system converts input for data manipulation and storage and converts back the output as the search and for restoring the interface representation of a previously saved search. In a further preferred embodiment, there is a system wherein the interface has a set of shapes to represent categories including but not limited to quadrants, spheres, circles, and expandable/collapsible lists. In a further preferred embodiment, there is a system wherein said interface optionally provides means for the user to select from a collection of searchable information what information to restrict or expand in the search by excluding or including a source of information; excluding or including a category of information. In a further preferred embodiment, there is a system wherein once a search is executed the user changes, as desired, the user-entered terms and their said logical operators, search operators, search parameters, and excluded and included sources and categories of information. In a further preferred embodiment, there is a system wherein the system persists the user-entered terms and said logical operators, search operators, search parameters, and excluded and included sources and categories of information, as applicable, in a storage medium according to what has been input or selected by the user. In a further preferred embodiment, there is a system wherein the system uses a search engine or other device to execute the search in real time according to the user's changes in said interface, or the system uses a search engine or other device to execute the search when the user chooses to execute it using said interface, or the system generates the search without executing it to view and copy. In a further preferred embodiment, there is a system wherein there is an option to show the results of the search-engine-executed search results appended to said interface. In a further more preferred embodiment, there is a system wherein the user retrieves persisted searches, repeats said searches, makes changes to said searches, and resaves said searches as new searches. In another embodiment, the system comprises a computer. In yet another embodiment, the system comprises a processing unit. In yet another embodiment, the system comprises software. In a more preferred embodiment the system comprises software selected from the group consisting of application software and system software.

In another embodiment of the present invention the system comprises a computer-implemented graphical user interface, the interface having one or more areas, some of which are input areas for a user to enter terms that are words, phrases, or other data; wherein the system enables the user to select one or more said terms and drag and drop or otherwise place into a designated or delineated area of said interface for the user to show desired preference for the importance of said terms relative to one or more other terms in said area in accordance with their relative position; wherein said area is either a category that is associated with a logical operator or search operator or search parameter or an area that is not associated with any of these; and wherein the system assembles the output from the user input to generate a syntactically correct search that specifies the relative importance of said terms with respect to each other for said operators or said parameters or for either or neither of these. In a preferred embodiment, there is a system wherein the system resizes said terms or changes their color or changes their prominence by some other graphical means as the user moves the term.

In another embodiment of the present invention the system comprises a computer-implemented graphical user interface, the interface having one or more areas, some of which are input areas for a user to enter terms that are words, phrases, or other data; wherein the system enables a user to select said terms and drag and drop or otherwise place into a designated or delineated area of said interface; wherein said area is either a category that is associated with a logical operator or search operator or search parameter or an area that is not associated with any of these; wherein the system provides a method for the user to associate or disassociate said terms and to move associated terms closer together or further apart in said area; wherein the system uses the proximity of the associated terms in said interface to measure by units, wherein the units are selected from the group consisting of character count, word count, paragraph count, and other means, wherein the measurement is the maximum range between associated terms; wherein the system shows to the user with a connecting line or other graphical means the connection between the terms and the proximity of the terms in the interface by displaying said count; and wherein the system assembles the output from the user input to generate a syntactically correct search that specifies the maximum said range between said terms for said operators or said parameters or for either or neither of these. In a preferred embodiment, there is a system wherein the system has the option within said interface for the user to select another unit of measurement for said proximity.

Definition of Terminology

A "term" or "search term" may be words, phrases, or other data representable as text entered by the user by some means into the user interface using an input area.

A "category" is coincident with an input area or another area and is associated with a logical operator or a search operator or a search parameter or with none of these.

An "input area" is a graphically delineated area or another area of the interface that accepts the input of terms.

A "logical operator" is a symbol that applies a condition or expression to more than one term.

A "search operator" is a symbol that applies a filter or command or modification to one or more terms.

A "search parameter" is an attribute of any data type that may be entered or selected or chosen by some means and applied to one or several terms.

DETAILED DESCRIPTION OF INVENTION

Figure 1:
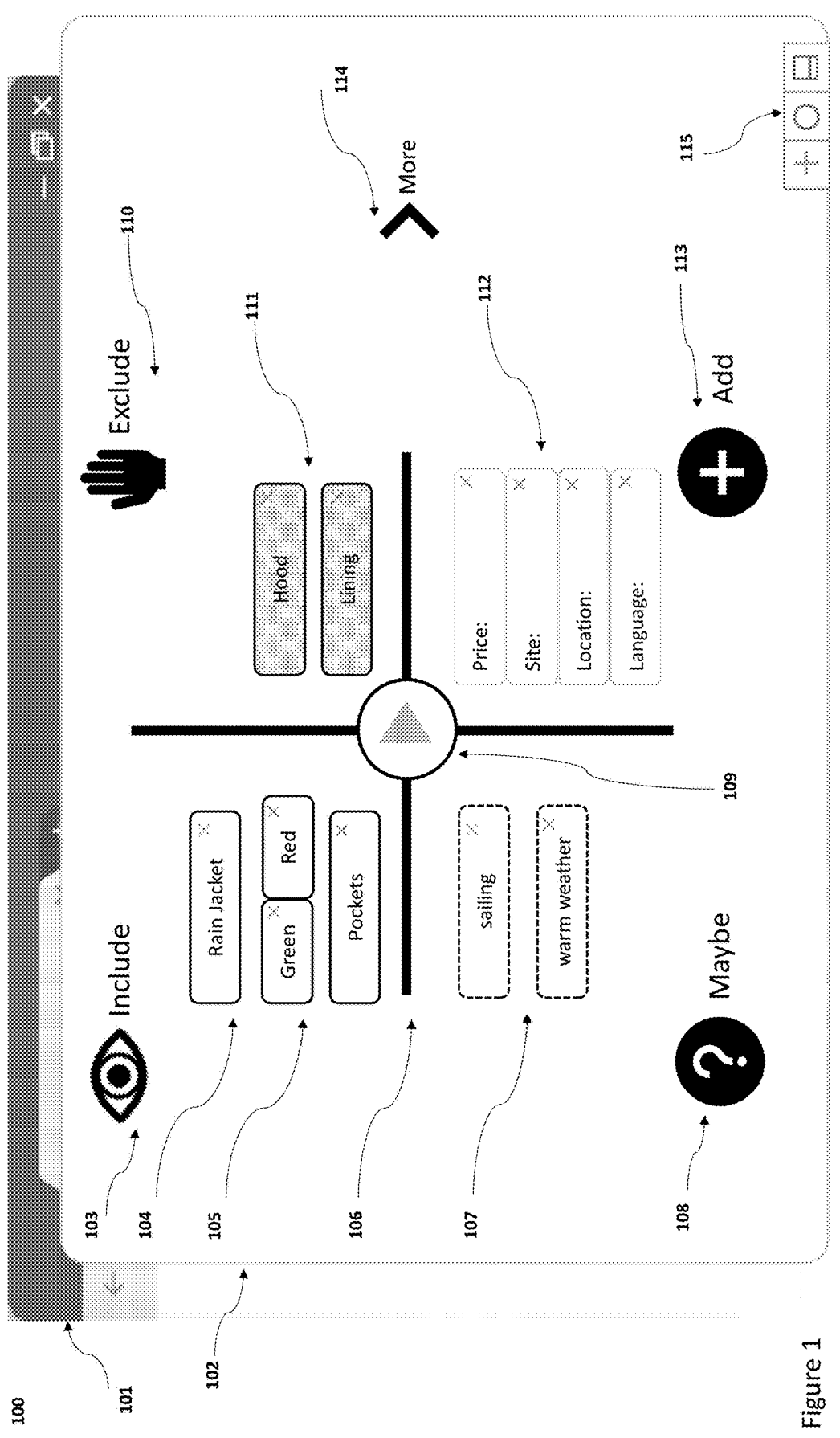
FIG. 1 illustrates one of the views of a preferred embodiment, divided into quadrants representing categorical input areas.

The present invention presents an interface with visual choices for users that categorize their search intentions. The categories correspond with logical operators, search operators, and search parameters—the definitions of which have been defined in the Definition of Terminology. The user can enter, categorize, move, and remove search terms. The interface enables the insertion and association of terms or some other ordering of terms that may be represented in the search to denote, for example, importance or proximity. This enables the syntax of the search to be constructed without users having to understand the syntax.

Users may modify and repeat searches to improve the results if needed. The interface facilitates iterative searches in which the user may enter a few terms at the beginning of the search and then add additional terms to narrow the results. Inversely, the user may enter many terms at the beginning of the user's search and then remove terms to broaden the results. The present invention may execute the search as the user changes input terms and allocation of terms to categories in real time or at user-initiated moments as the user changes input terms and allocation to categories.

The present invention may function as a search filter interface in which finely calibrated changes in the filters can be applied, tested, and saved. The present invention has embodiments with dedicated "filtering" and "focusing" features.

The user needs to know little or nothing about the syntax and its meaning for a particular search engine because the interface provides the necessary heuristics to guide the user toward syntactically optimized search instructions.

For example, it is common for a user to be unaware of the potential use and value of the Boolean operators. Besides AND, the usual default, there are OR and NOT. In three-valued logic, there can also be an indeterminate or NULL value. These operators may be represented, respectively, as categories for included terms, alternative terms, excluded terms, and optional or unused terms. Other examples of intuitive categories are "Preferably", "Instead", and "Between"

The user may access through the user interface categories and the terms they may contain many search operators and search parameters—the distinction between these search options being as previously defined. The available search options are subject to a search engine's exposed operators and parameters. The present invention represents these to the user at the categorical level and for terms they contain and their relationships.

User input into the present invention's interface is translatable to the syntax of multiple search engines according to a greater or smaller set of logical operators, search operators, and search parameters in those engines' search syntaxes. The system may use interchangeable sets of search-engine-specific symbols and syntax rules that may be associated with the user input. The user may apply the search to another or several other search engines, even simultaneously, without the user's needing to make changes to the input in the interface.

The present invention's search interface may be implemented with a web page, as an extension to a web browser, as a desktop program, as an app for mobile devices of any type, and in other ways. The user can enter search terms (for example, individual words or word phrases) using any input method, including typing, dictation (spoken words), and/or the use of a pointing device. Input is directly into the graphical interface of the present invention, divided into input areas that may or may not, in all cases, correspond with visual categories.

To enable easy switching between the embodiments' interfaces and the search results interface, such as that of Google or Bing, the user interface may be placed on a floating window. This is an existing facility of HTML5 with some additional published code for implementation in the Chrome or Edge browsers. Other methods of switching back and forth can be implemented on any device. Alternatively, the search-engine-generated results can be appended to the interface of the present invention.

Web page embodiments on desktop, tablet, and phone devices use HTML5's modern standards of interface responsiveness. Other embodiments, using a separate user-selectable app can be implemented with a viewable input screen that may be easily accessed or hidden. The method of appending the search-engine results to the interface may also be used in some embodiments. Other implementations of the present invention, for all kinds of web-capable (or other information presentation) devices, are possible for one skilled in the art.

Syntactical Analysis

The following non-limiting example illustrates one method for the present invention to provide the means for generating a search. Consider a user with the following objective:

I'm looking for a rain jacket without a hood, for sailing in warm weather. It can be green or red, I don't want it to have any lining, but it must have pockets. The price should be between $50 and $100.

The user may often enter a list of words into a search engine as the user thinks of them, resulting in a search like this:

rain jacket no hood sailing warm weather green or red pockets no lining $50-100

Of course, the order of words and the presence or absence of prepositions, conjunctions, adjectives, and punctuation marks vary. Regardless, this type of search fails to take advantage of the symbolic instructions the search engine provides for precise parsing.

In contrast, the present invention promotes the entry of search criteria that may be precisely parsed or interpreted by the search engine.

This method of assembling the search as illustrated for the example of terms and categories in FIGS. 1-5 yields a search engine search similar to this:

"rain jacket" green OR red AND pockets|sailing| "warm weather"-hood-lining $50 . . . $100

This is illustrative of symbols corresponding with some common categorizations of user-input terms from which searches may be output by the system. However, the present invention is not limited to any finite set of logical operators, search operators, and search parameters.

The generated search is assembled according to the syntactical rules of the user-selected search engine. The system associates a set of search-engine specific symbols with the search terms as they relate to the categorically or otherwise-defined logical operators, search operators, and search parameters. The assembled search is the same or equivalent to one entered by a user who understands and uses the search syntax of the search engine. The aforementioned set of symbols may be updated as a search engine changes its query syntax without any change to the disclosed interface.

More precision can be given to searches globally by using "filtering" and "focusing" search capabilities. They are global because they are applied by default to all user searches unless the user changes them or specifies otherwise. These search options can be implemented within search engine and web browser constraints. In a preferred embodiment the user interface for filtering and focusing is placed in a user-optional sidebar view. The sidebar may be shown or hidden by the user. In other embodiments, the whole interface or elements of this interface may be placed in other locations or may be omitted.

Filtering

Filtering enables users through the interface to exclude "metacategories" of information and the particular websites associated with them. Examples of metacategories are politics, adult material, and social media. A user's selections may be persisted for subsequent searches until the user removes them.

For example, a search for the word "conspiracy" may yield results that expose conspiracies, results that explain conspiracies, and results that promote conspiracies. With respect to the internet, this value mix may occur in any search that does not exclude some social media sites. Some embodiments of the present invention enable the user to selectively exclude social media sites—one, some, all.

The present invention excludes metacategories from search results by using static or dynamic lists of websites classified according to a metacategory. Other technical implementations are available.

Users can also fine-tune filtering by entering certain terms within an Exclude category on a search-by-search basis with or without choosing to exclude a metacategory.

Focusing

Focusing enables users through the interface to specify search criteria on which to focus searches. Focusing shows results that predominantly accord with a particular search criterion or criteria. A user's selections may be persisted for subsequent searches until the user removes them.

For example, focusing may begin with language. A search engine usually uses IP-based geolocation for country/language localization. If the user resides in one country but wants to get results from another country and language, the user may choose a Language option (which may change a browser-based setting to switch from one language to another).

In other cases, focusing is for subject matter. If the user wants results focused on history, the user may choose a History option. This adds history-related global search words. For example, if the user enters "social" in the Include category of an individual search, for as long as the History option is selected, the results will mostly be related to social history. If the user enters "political" in the Include category, the results will mostly be related to political history.

(Another embodiment of the present invention may use a more sophisticated facility for subject selection, such as by using Google's Knowledge Graph database API.)

Importance and Proximity

The present invention includes embodiments to represent a relative property between search terms that can be expressed with a visual metaphor for the position or connection between terms. The search engine must have a corresponding search operator. In one example, the user may give greater preference or importance to one or more words in a search than to others (regardless of a term's normal frequency in search results). In another example, the user may specify a word count (or another counting unit) between two search terms as the maximum to be set for the search.

Interface of the Invention

The following section describes preferred embodiments of the graphical user interface of the present invention and how it is used.

Figure 2:
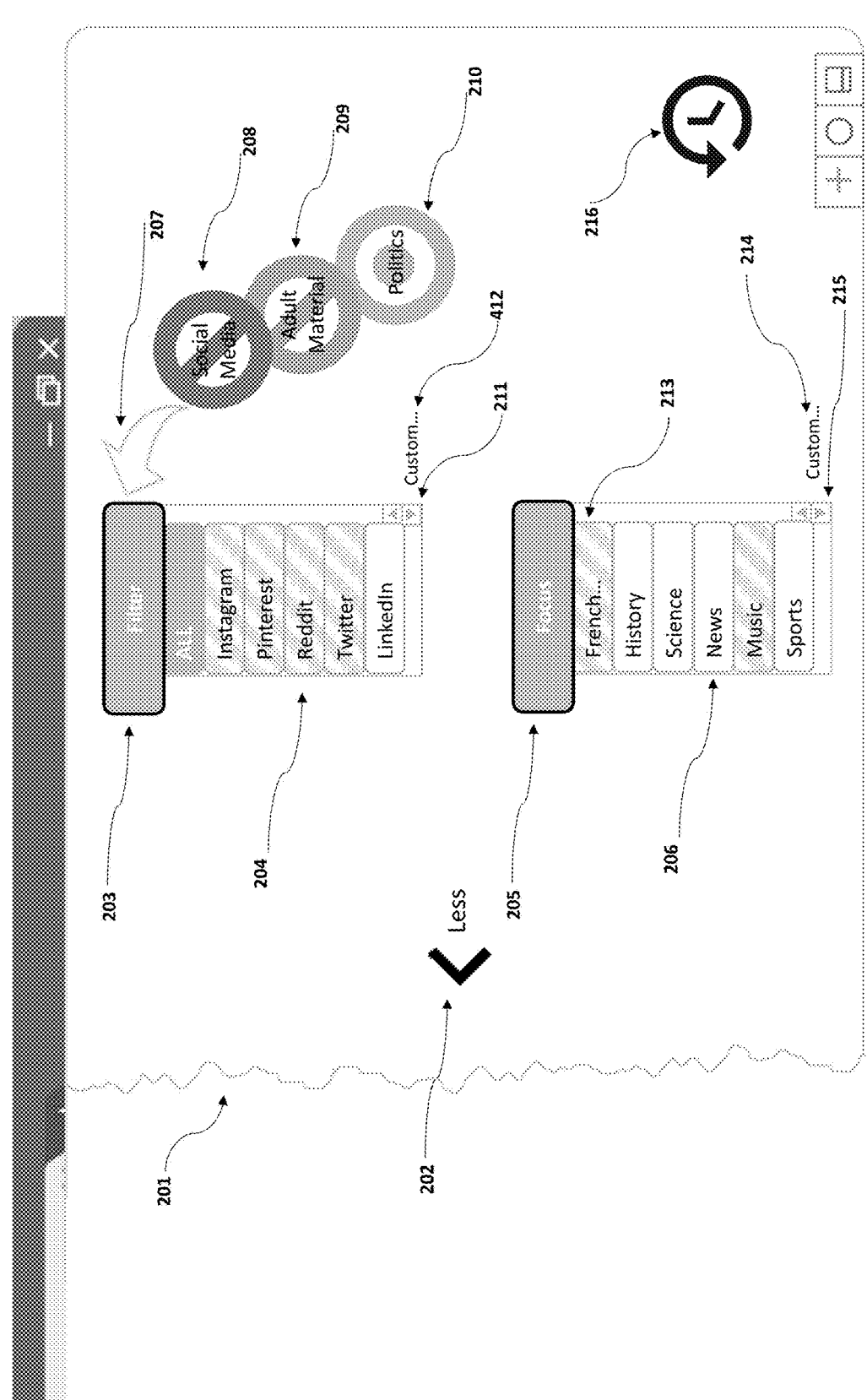
FIG. 2 shows additional optional facilities of the search interface in a sidebar, in which one feature filters out unwanted results and the other focuses the results.
Figure 3:
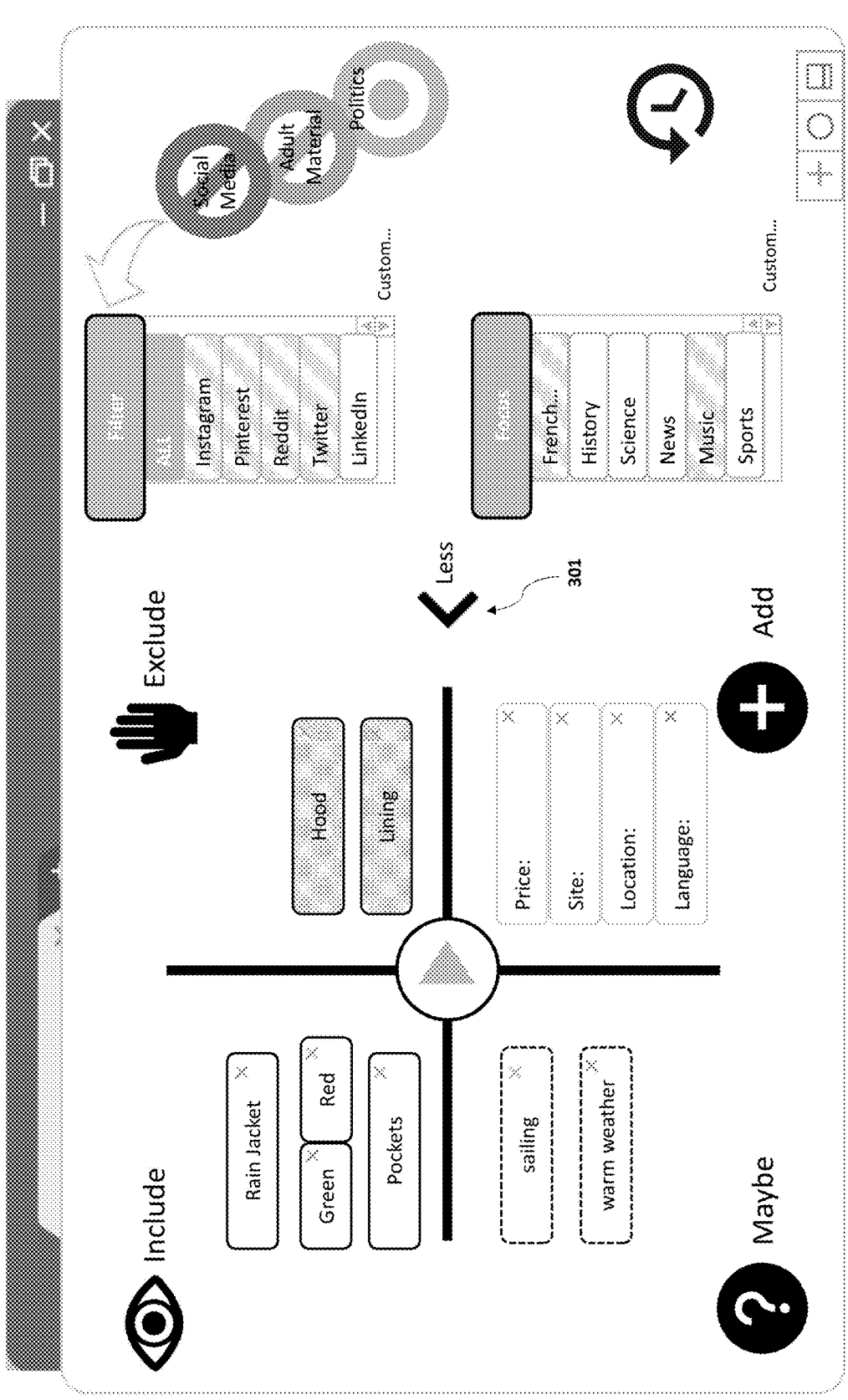
FIG. 3 shows one interface with the sidebar open. (The sidebar could appear on any side of the main window and could change position in a responsive window.)

FIG. 1 illustrates an embodiment in which the main interface window or screen 102 floats over a generic browser window or screen 101. The interface displays a division into quadrants 104, superficially resembling a Cartesian graph. Other features of the embodiment are illustrated in FIG. 2. In FIG. 3, the complete interface is shown on a single window or screen. The description of how the user interface is organized and used is provided for this representational interface, as its method of use generally corresponds with the other three interfaces that are described.

The user interface of the present invention is not limited to these graphical representations. Furthermore, the arrangement of elements in each graphical representation may be different without altering functionality. Furthermore, some categories may be added and removed. Furthermore, the system may permit the user to arrange the categories and coincident input areas.

In the aforementioned interface of quadrants, the user has four labeled and preferably iconized input areas that can be equivalent to: Include, Exclude, Maybe, and Add. Each category applies to one quadrant of delineated X and Y axes. The user can input text in a free-form fashion anywhere in the Include, Exclude, and Maybe categories after the user performs any action that selects the corresponding input area, such as clicking or tapping it. An alternative embodiment is for the interface to provide a separate input area 901, into which the user may enter terms and from which the user may then move the terms to categories with or without coincident input areas.

The top left quadrant 103 may be labeled with a word such as Include and an icon such as an eye. This quadrant permits text input directly or indirectly of any terms (in any order) 104 that the user would normally include in a search.

(When the user enters words in this quadrant, it is equivalent to the user entering words into a conventional single-field search interface and would produce the same results. The type of autosuggestion available in the conventional search engine field may be made available to the user when entering text in this category by using an API. The system may provide the user with interactive suggestions.)

The top right quadrant 110 may be labeled with a descriptive word such as Exclude and an icon such as, for example, a hand (for halt). This quadrant permits the user to enter terms 111 to exclude from a search.

Figure 9:
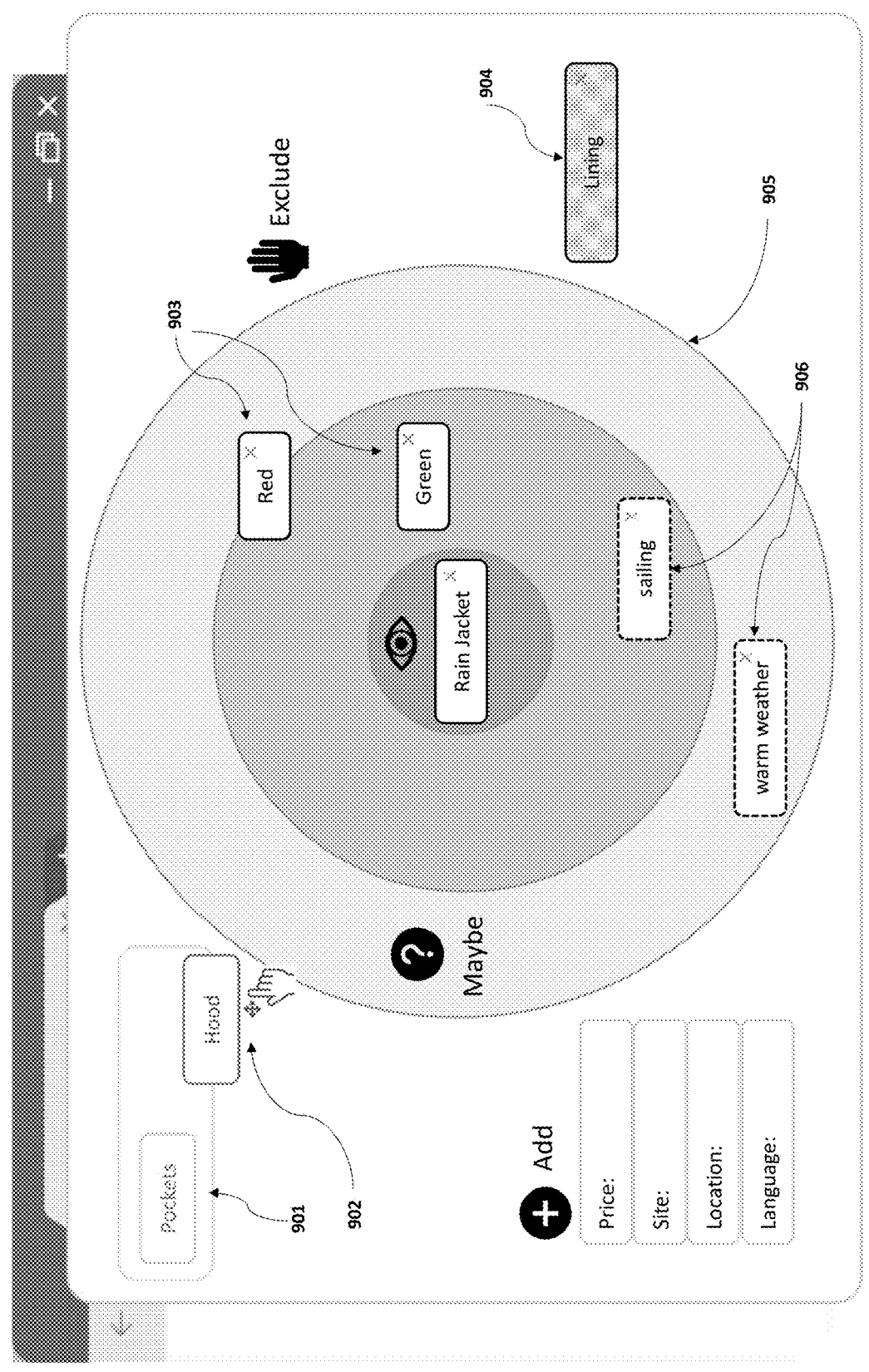
FIG. 9 illustrates a preferred embodiment in which the interface uses a drag-and-drop method to specify and show preferred or important terms.

The bottom left quadrant 107 may be labeled with a descriptive word such as Maybe and an icon such as, for example, a question mark. This quadrant permits the user to enter optional terms. Other uses for this category, such as favoring a result that includes a term (as illustrated in FIG. 9) but without excluding results may be used. Alternatively, the category may be used for words that are just placeholders—without affecting the search—for a user's "mental notes".

The bottom right quadrant 112 is labeled with a descriptive word such as Add and an icon such as, for example, a plus sign. This quadrant is for search parameters—such as price, site, range, location—which modify the search. For each of these examples and other parameter options the user may enter or select or choose by some other means values in a manner appropriate for the parameter attribute.

In one embodiment, a Go/Start button 109 is placed at the intersection of the X and Y axes. If included, this button may have multiple uses. For example, it may allow the user to switch from the present invention's interface window to the search engine's results window. Alternatively, it may cause the search engine's results window to update the search engine's results when the user chooses clicks or taps it. It could serve both purposes. Alternatively, the updates to the search and its execution could take place in real time, in which case the system may hide the button.

Each preferred embodiment may contain a selection control 115 for switching directly to the other graphical representations of the interface. Each such representation of the interface may be selectable by an icon or label in this selection control (as illustrated within the selection squares of 115) and the currently selected graphical representation's icon may be disabled or otherwise altered or inaccessible. Note that in the case of the closely related interface representations with circles or spheres (FIG. 6 and FIG. 7) appearing separately or overlapping—the latter to suggest a Venn diagram—an additional icon may be added to the selection control 602 and 704 to distinguish them. These embodiments do not preclude the omission of this selection control.

The user has additional facilities in the search interface FIG. 2. In the preferred embodiment, this part of the interface is confined to a sidebar, and the user can hide or reveal these options using a More command (labeled and/or iconized) 113.

The sidebar is shown as the right side of the window in this case—with torn edge (left) 201 for illustrative purposes only. In the sidebar, one portion of the interface is for filtering unwanted results and the other portion is for focusing results. The purpose of these capabilities has been described previously in this detailed description of the present invention. In this embodiment the user may use two list-selection boxes, 203 and 205, to perform these functions.

As an example, list 203 is labeled using a descriptive word like Filter. The list shows content of a selected metacategory and the websites that host this content. The metacategories are represented by labeled icons (circular shapes in this representation). When a user selects one of these, the list-selection box is populated by websites that are focused on this type of content.

In the example shown in FIGS. 2 and 3, the user may select from metacategories Social Media, Adult Material, and Politics 208, 209, 210. When the user clicks or taps one of these, it may appear upmost and/or highlighted to indicate selection in a standard manner. In this embodiment, an arrow 207 points from the selected metacategory to the list selection. Other content metacategories may be included in the interface.

The initial state of the listed sites 204 represents their content as excluded from results. The user can enable sites individually (by a standard selection method) or select All to include results for all the listed websites. As an example of reinforcing visual feedback for the user, the "banned" sign 208 could become a "bullseye" sign 210 when all or some websites are enabled for a category.

The system or the user may reverse the default initial state from exclusion to inclusion. The above are suggested graphical representations but are not the only representations of the user's selection and the system selection methods.

In the list-selection box, a standard scroll-down-or-up button 211 is provided. There is a Custom . . . option 212 that opens a standard interface (not illustrated) that has a list of websites that are not excluded or included in the search results. In some embodiments, the list of websites may be populated statically or dynamically, and the user may add or remove websites.

The back-end components of the software that implement the user interface may, for example, acquire data by dynamically listing sites in content categories. Eliminating pornographic or violent sites could use third-party software. Features such as Google's default SafeSearch are readily available. Finer-grained filtering can be obtained by the user through appropriate filtering of search results using the Exclusion category.

Another list 205 is labeled using a descriptive word like Focus. The list represents metacategories of information in which a search may be focused, such as Science, Geography, History, Sports 206. The user may select one or more subject-matter categories.

The default state is that no subject-matter category is focused on—that is, none is weighted to be more prominent. When the user selects one or more items from the list, sources for that subject-matter category are weighted to be more prominent in the user's search results.

A scroll-down-or-up button 213 is provided. There is a Custom . . . option 212 that opens an interface in which subject-matter categories that are not included in the default list may be added (selected or entered by the user) or removed by the user.

In some embodiments, the user's Filter and Focus selections are persisted (or saved) automatically and independently of search terms entered by the user.

The Save/History command 216 may be shown to the user in the sidebar or main interface as a means to save a complete search with all search words (in addition to the filter and focus selection). The user can then return to the search history and reopen persisted searches to be redisplayed in the user interface. Besides the default date/time of the search being automatically recorded, there is the option for the user to enter an easy-to-remember name for the search and, further, the system may save search terms in the search history. The user may find a previous search or searches by entering terms recalled by the user.

FIG. 3 illustrates the complete interface with a Less command 301 (which may be labeled and/or iconized) to close the sidebar. The sidebar could appear on any side of the main window and could change position in a responsive window.

Figure 4:
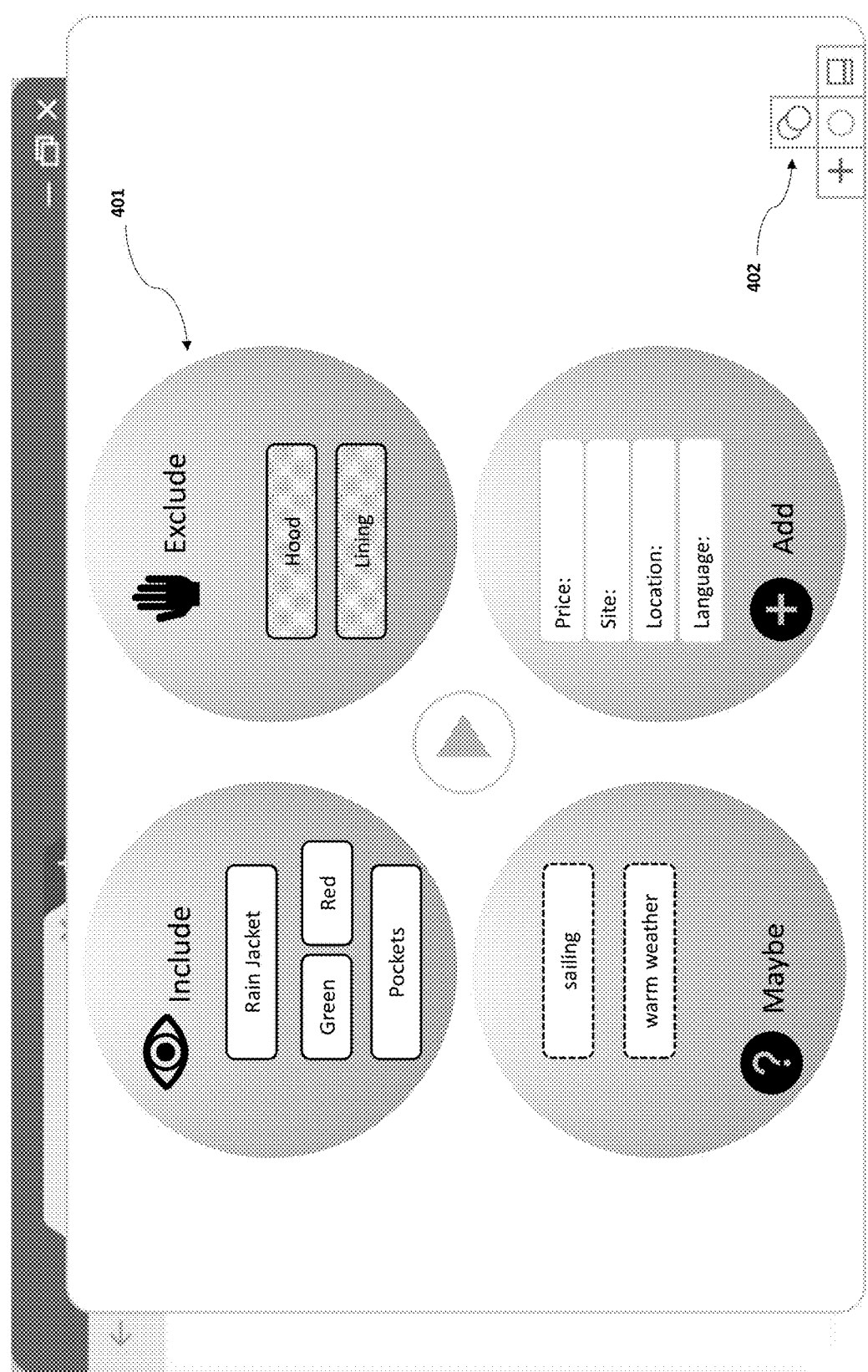
FIG. 4 illustrates a view of a preferred embodiment with an alternative representation of four input categories by using circles or spheres.
Figure 5:
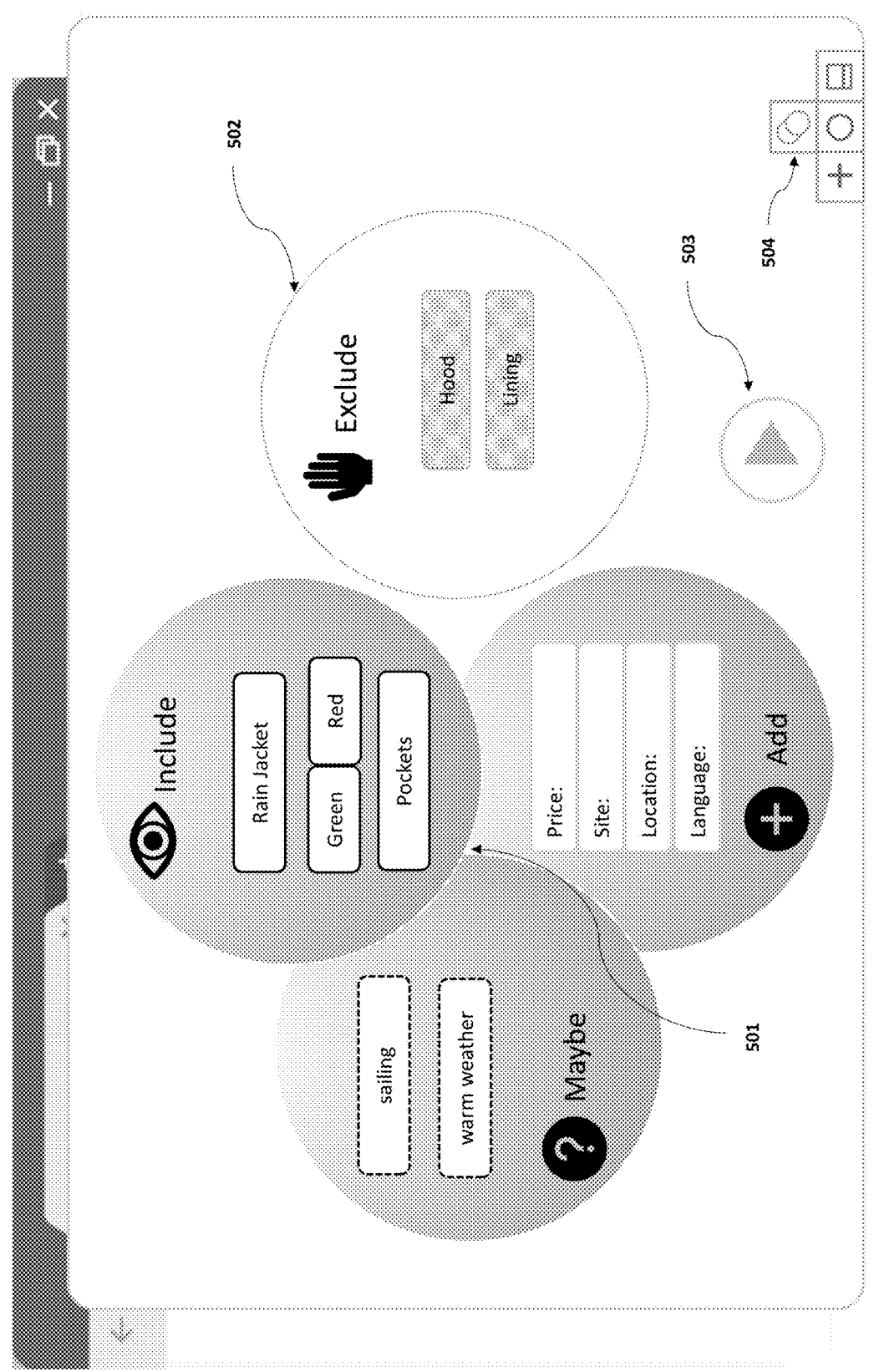
FIG. 5 illustrates a view of a preferred embodiment with intersecting circles or spheres, resembling a Venn diagram.

FIG. 4 and FIG. 5 illustrate alternative graphical representations of the present invention's interface. For some users, an enclosed shape such as a circle may be preferable to quadrants. With spheres, in particular, a user interface design may use depth perception as an interactive feature. For example, upon user selection a term may come to the foreground of the sphere. An additional use of foreground perception may be employed for the user-selected relative importance of a term.

FIG. 4 presents categories that are delineated by nonintersecting circles or spheres. The user input and selection methods are equivalent to those for quadrants.

FIG. 5 presents an alternative representation of categories using intersecting circles or spheres. This representation uses an approximation of a Venn diagram to visualize the relatedness of some categories, which may be intuitive to some users. The three sets that form logical intersections are Include, Maybe, and Add. Their intersection is illustrated 501 but not populated. As an optional visual enhancement, entering text in one sphere could bring that sphere to the top above the other two. Since the user requires confirmation of excluded items, in the fourth set, the Exclude circle or sphere 502 is shown not to have an intersection with the other three. This representation shows an alternative position for the Go/Start button 503.

(Since representations of nonintersecting and partially intersecting circles and spheres are closely related, the interface may provide a four-way selection box 402 and 504 when either representation is shown, with the icon for the currently selected representation disabled.)

Figure 6:
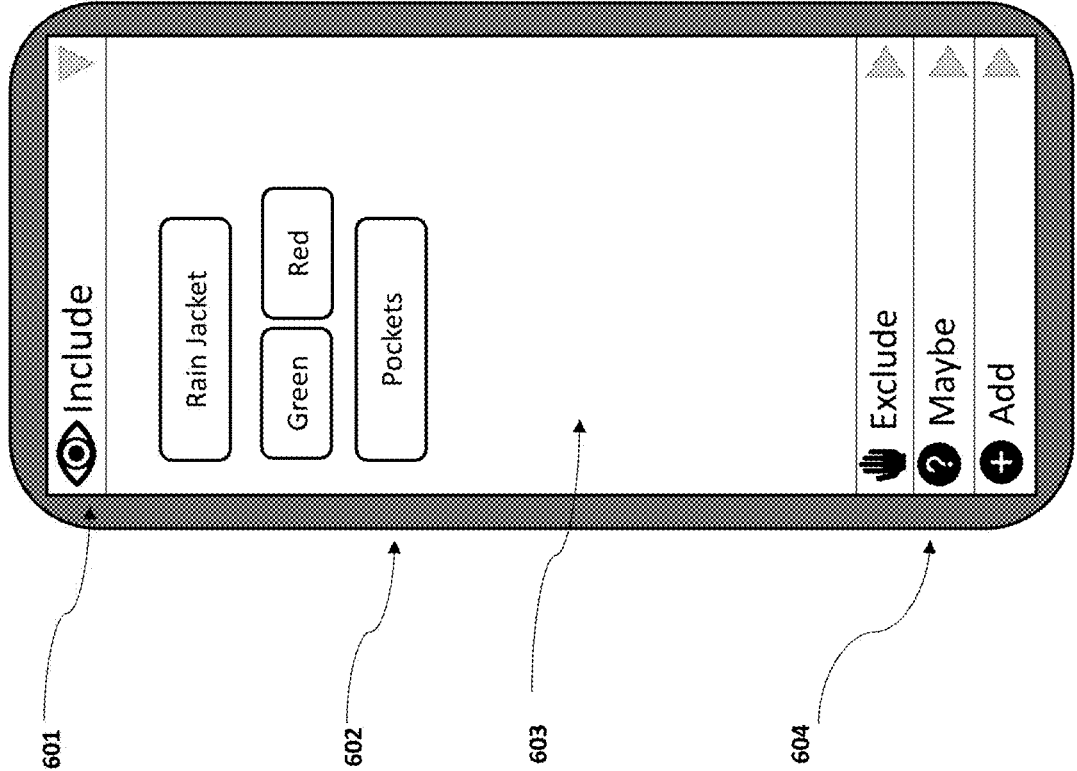
FIG. 6 illustrates a third and distinct view using an expandable/collapsible container control with sections for four input categories.

FIG. 6 illustrates an embodiment in which the user interacts with the interface using an expandable/collapsible container object. Such an implementation may be better suited to a compact mobile device, such as a phone 602. This arrangement may also better suit a more linear mental model of some users. The container object is divided into sections corresponding with categories, as described for the other embodiments.

Figure 7:
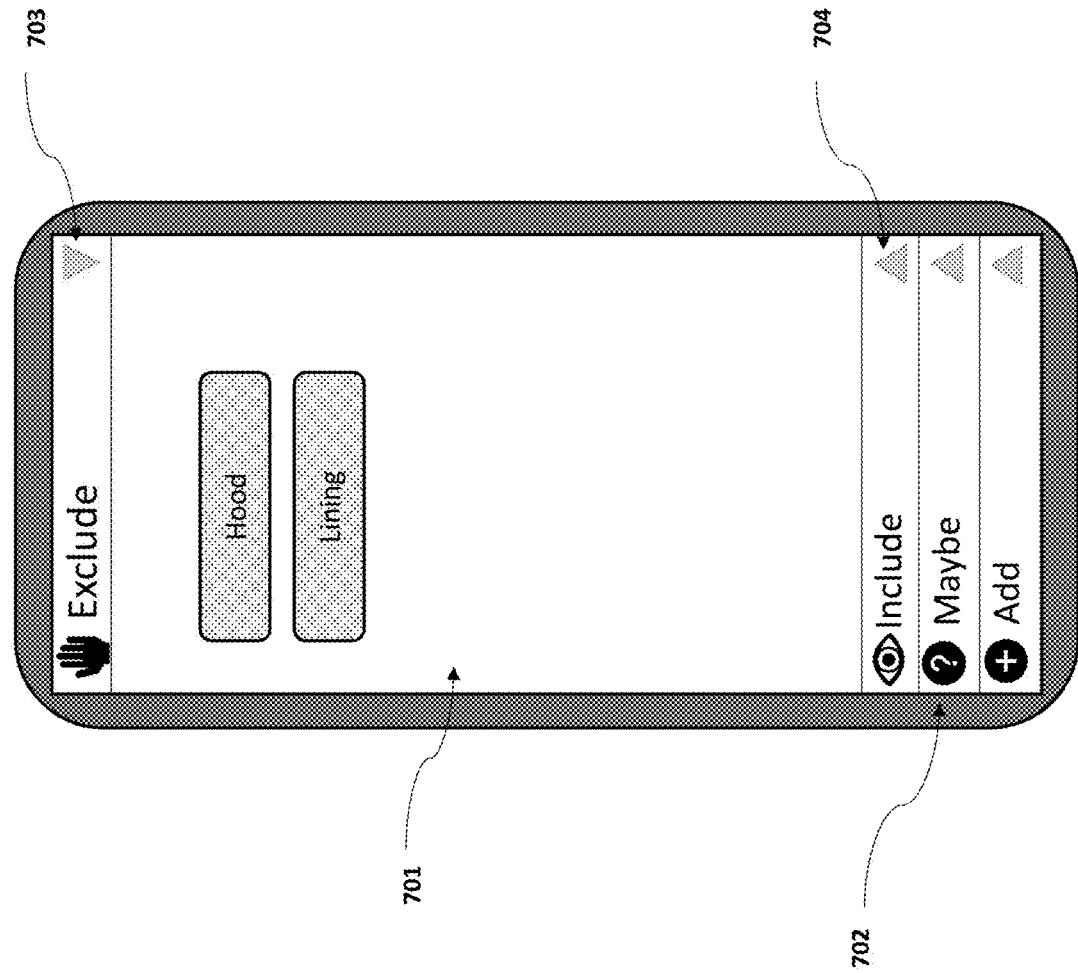
FIG. 7 shows another state of the container view, with another section expanded and the other section collapsed.

One embodiment shows one section at a time, by expanding one input area and collapsing the others. As illustrated in FIGS. 6 and 7, the initially expanded Include section 601 is shown to the user, who can enter search terms in the input area 603 as in the other embodiments. The other sections 604 are collapsed. In FIG. 7 the Exclude section is expanded. The user may click an icon 704 to expand another section, for example Maybe 702. This collapses the currently visible input area 701.

The user may drag and drop terms from the expanded section onto one of the collapsed sections. The collapsed section may open temporarily to confirm to the user the addition of the term. By clicking on this temporarily open section, the user may keep it open. The user may click an icon 703 to collapse all sections. Upon collapsing all sections, there may be shown additional features such as, for example, an embodiment of those in the FIG. 2. sidebar.

Figure 8:
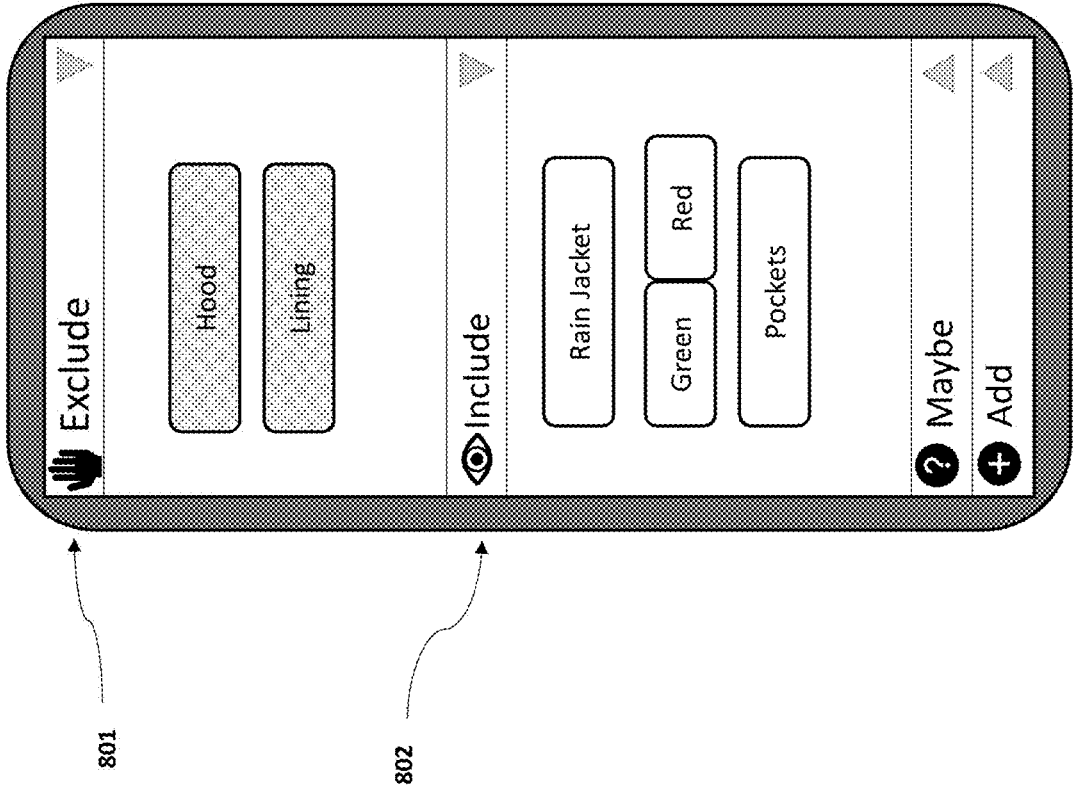
FIG. 8 shows a variant of the container view in which each section remains expanded after the user opens it and until the user chooses to close the section.

FIG. 8 shows an embodiment in which two or more sections are open at the same time. In this example, the Include section 802 is partially expanded when the user expands another section such as Exclude 801 until the user chooses to close one or both sections. A user may find it easier to work with two or more sections that are partially expanded, so as to see, for example, what terms are contained in each section.

Note that additional features to those described in this disclosure are not illustrated, but may be added to either of the container embodiments. Changing the aforementioned categories and adding other features of the other preferred embodiments in this compact interface may be accomplished by one skilled in the art using the principles described for the other embodiments.

FIG. 9 shows an embodiment for the user to specify the relative importance of terms. The user inputs terms in an input area 901 and may then drag the terms 902 to a region, such as a circle or concentric circles 905. The user drags terms that are more desired or important in the search to the center of the circle and terms that are unwanted to the outside of the circle 904. The use of a dedicated input area is an optional feature of the embodiment.

Within the circle or other shape, an area (such as the center) is where the user may drop or otherwise place terms that are considered of most importance to the user. The user may move terms around in the circle away or toward the center to show and determine emphasis. In one case, sailing is weighted over warm weather 906.

Additional visual means for emphasizing terms to represent importance may be implemented. For example, words may be shown larger or bolder. Another embodiment may use the graphical representation of spheres (FIGS. 4 and 5), whereby a term of more importance appears in the foreground and/or the center of the sphere. This may be as an effect of the user dragging terms or making the change directly by clicking or stretching terms or some other method regardless of there being a spatial component or not.

Using the example of the two color terms 903, there is the possibility of blending basic categories with weighting to provide a continuum of user preference. There are undocumented but demonstrable methods for weighting terms in search engines, such as by ordering or repeating words or decorating individual words with one or more pairs of quotes or asterisks or some other symbol. For example, in a Google search additional weighting may be given to "green" by repeating the term twice consecutively:

"rain jacket" green green OR red

The system may implement this behavior without categories or within categories. FIG. 9 illustrates a standalone embodiment. However, another embodiment, such as those using circles or spheres (FIGS. 4 and 5), may use this method for the user to prioritize importance inside a category, particularly the Include category. To make the feature easier for the user to work with, the Include circle or sphere may be larger than the others. Weighting terms may be used with search operators, such as Proximity, or with search parameters, such as Language.

Figure 10:
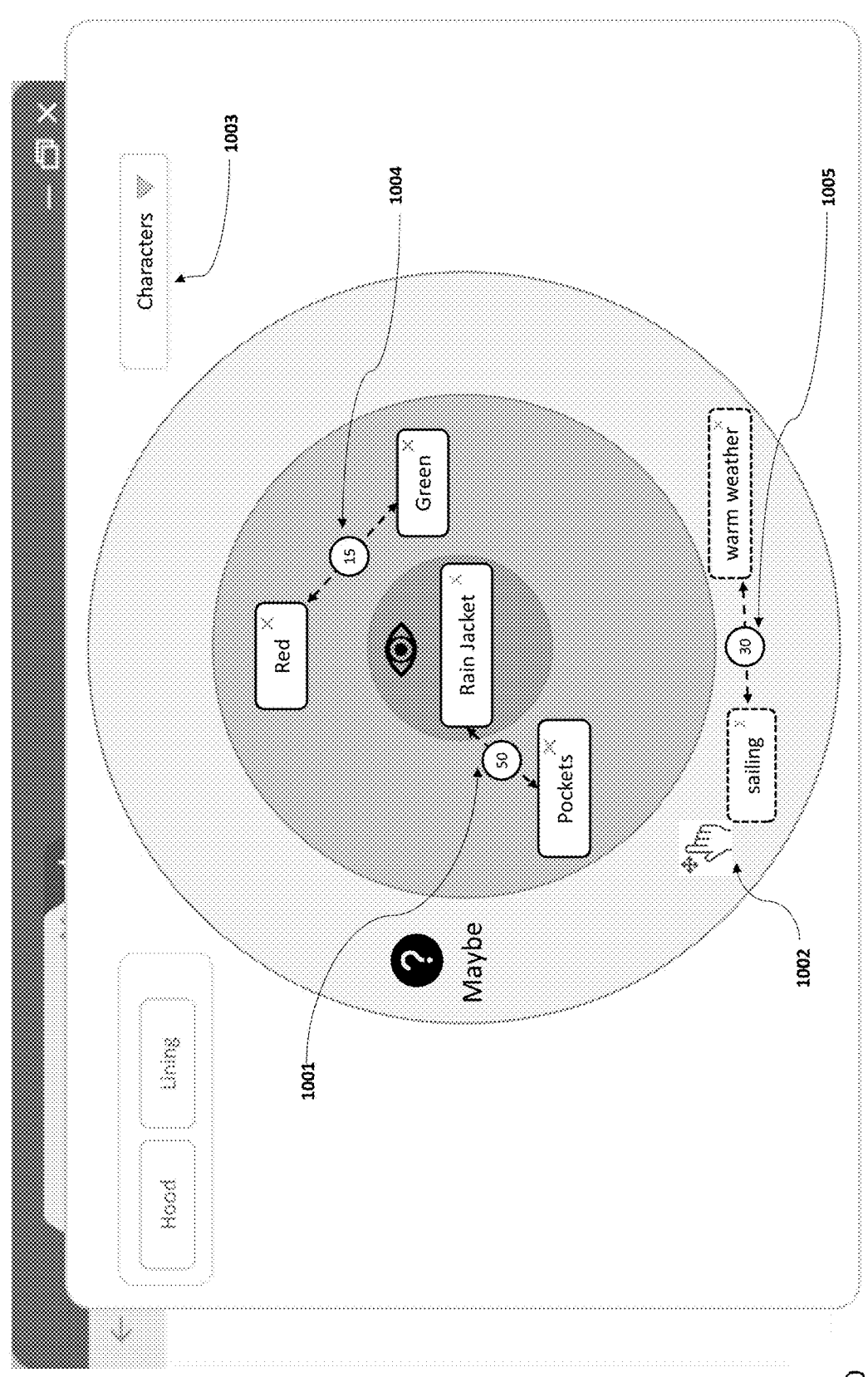
FIG. 10 illustrates a preferred embodiment in which the interface uses a drag-and-drop method to specify the proximity of terms in textual content.

FIG. 10 shows an embodiment for the user to specify the minimum proximity of words—that is the maximum distance, by some measure of units, between two terms in text. The system provides the capability for the user to specify proximity according to a range, whether by character count or word count or paragraph count or some other counting unit.

The means for the user to do this is to drag terms together or apart, for which the interface displays the count and a connector 1004 between the terms. The user may initiate such a proximity connection by a method such as dragging the term boundaries together so they are touching and then dragging them apart 1002. Another selection method may be used. The user may disconnect the association of terms by some other means such as dragging one of the terms outside the circle or other shape.

Users may choose the measure of proximity they would like to use—the counting unit—for which Words would be the default selection (as at least one search engine is known to support this feature for words). A list selection 1003 is provided for this purpose.

The user may conveniently and iteratively increase or decrease the count. This feature is complemented by the user selection of which websites and subject matter to include or exclude in the search, which can be accomplished through filtering and focusing (FIG. 2).

Proximity and importance are search operators that may be combined. The embodiment as illustrated in FIG. 10 is combined with the previously described embodiment for representing importance, FIG. 9. There are documented means for search engines to specify proximity, as by using Google's around (n) search operator.

OTHER EMBODIMENTS

It should be noted that the preferred embodiments that are described and illustrated in FIGS. 1-8 are described for four input areas, corresponding with four categories. In other embodiments of the present invention there may be fewer (FIGS. 9 and 10) or there may be a greater number of categories and input areas. Such additional categories and input areas may be for other logical operators, search operators, or search parameters as required. Other categories may be associated with many-valued logic.

The preferred embodiments may be elaborated so that the delineated categories and corresponding input areas are moveable and resizable by the user, enabling rearrangement of elements within the limits of the interface.

A further embodiment is the capability to "break out" certain parameters—that is, separate one or more from existing delineated input areas. This enables the user to see a parameter of importance to the user such as Location in its own delineated area that can be positioned by the user as desired. Breaking out the parameter may be performed by the user using drag and drop or some other method.

A further embodiment is for the user to move the delineated shape for a parameter, such as Language, close to or within another major category, so that the language restriction, or other parameter, applies only to that category.

Text Input of Operators and Parameters

Figure 11:
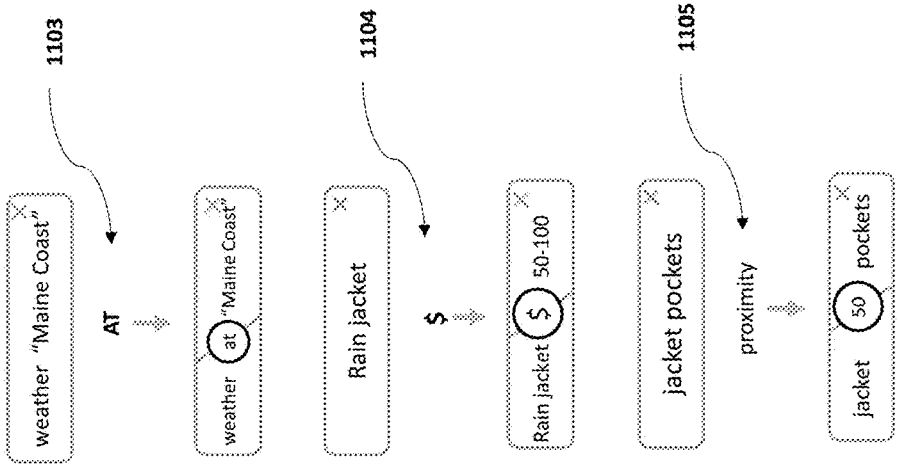
FIG. 11 illustrates several ways that operators can be visually represented between terms in the interface.
Figure 11:
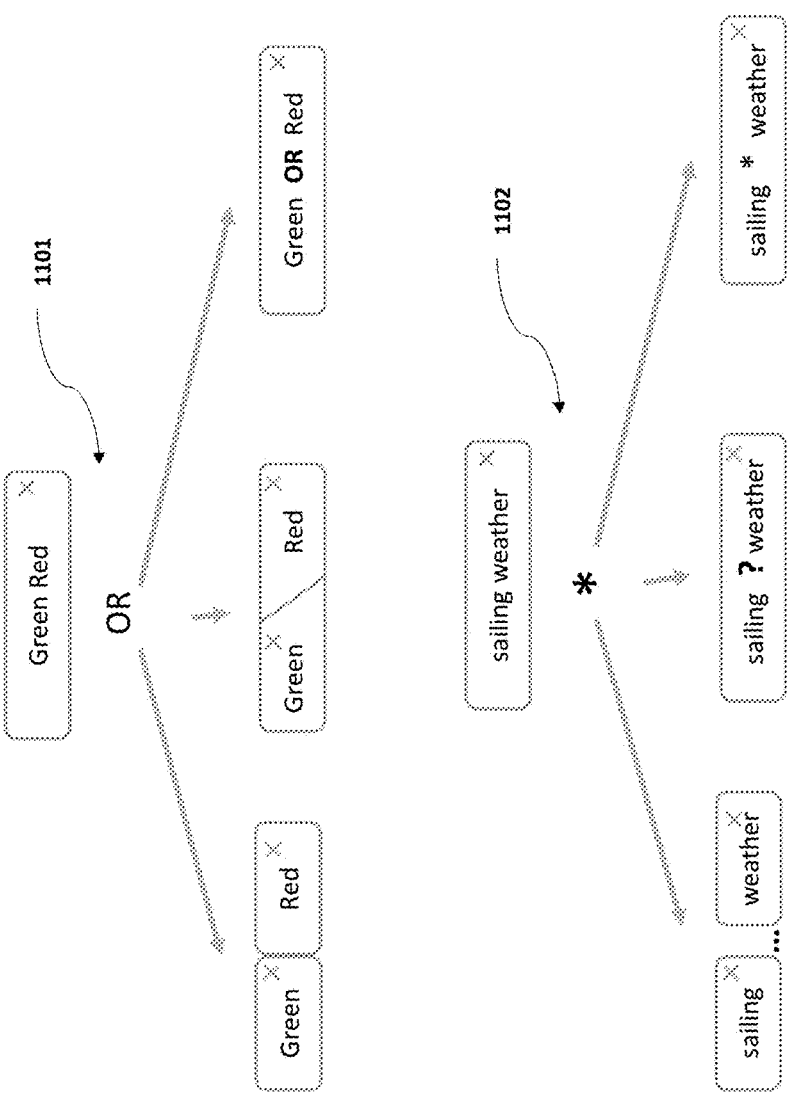

In some but not necessarily all embodiments, when a user clicks an input area and starts entering text the system may draw or apply an auto-sizing and auto-enclosing boundary, such as a rectangle (such as those illustrated in FIG. 11), around the entered text. The boundary shape may be outlined in any graphical way. The user completes entering the term by using a delimiter, such as typing a semicolon or pressing the Enter key or the Tab key, or an equivalent keyboard or pointing device action. For a mobile device, the user may use a tap, touch a virtual key, say a voice command, or do another action.

The system closes the boundary shape and draws a new boundary if the user resumes input. Line breaks may automatically be added to fit the input area occupied by the boundary shape. The category delineation and its input area can expand in the way responsive application elements do for desktop and mobile apps (using HTML5 or similar standards).

Any entered term can be modified by the user using some selection method, including clicking or tapping, that puts the term into editing mode. The facility to select, insert, and edit are features of the device that hosts the present invention. The system may show a small x in the boundary shape in order for a user to delete the boundary shape and text within it with a single-click or tap. Another method would be for the user to select the boundary shape and click or tap a Delete key.

The user has dragging options available in the preferred embodiment. Merging two separate boundary shapes may be achieved by selecting and dragging one to the other using a pointing device or finger or some other method. Separating text within a boundary shape may be accomplished by selecting the desired text and dragging it out of the shape or some other method.

The user may remove a boundary shape from a category without deleting it-one method being by selecting and dragging it outside the category, either to another category or to no category.

Some embodiments enable logical operators, search operators, or search parameters to be placed "inline" by the user. Operators or parameters may be represented by text, symbols, or icons displayed in or between boundary shapes. The user may apply operators or parameters to search terms using methods including but not limited to:

Entering them directly in a search term.

Selecting them from a collection of operators or parameters such as in a toolbar.

Selecting them from a context menu associated with the boundary shape.

The following are some examples of how inline operators and parameters may be represented visually after insertion by the user. In all cases, the user may easily remove inline operators and parameters and their associated text and symbols using selection and deletion or removal of operator symbols by dragging them from boundary shapes, among other methods.

With respect to logical operators, as an example, if the user enters an or between text, the interface may show the OR 1101 relationship within a search term as text separated by a conjoined boundary shape, or as text separated within a boundary shape by a diagonal line, or within the text by a prominent OR. Users may also use other logical operators as applicable within bounded text, resulting in similar visual representations.

With respect to search operators, as an example, a wildcard may be used with some search engines to find text before or after or in the middle of the user-entered search term. In 1102 if the user places the wildcard between bounded text, the interface may show two boundary shapes separated by ellipsis or some other representation of missing text or by text separated within a boundary shape by a prominent question mark or an asterisk. With a wildcard at the beginning and/or end of the text, the system may show an ellipsis before, after, or on both sides of a single boundary shape or may show question marks or asterisks before, after, or on both sides of the text. Users may also use other search operators as applicable within a category, resulting in similar representations.

The system may provide other methods for users to use operators or parameters and associated values, if applicable, between words or phrases in one boundary shape for a specialized result. In one embodiment, a dividing line with a circle and a symbol or value may be shown in the boundary shape as illustrated in 1103, 1104, and 1105. In one case 1103 the user is using a search operator for seeking information about a location. In another case 1104 the user is setting a price range parameter. In a third case 1105 the user is applying the proximity search operator inline with a count value between two words.

It should be understood that the choice of symbol or word or icon for any operation, as in the preceding examples, is not limited to those suggested in the preceding description. In some cases, to give one example, for the user's ease of recognition, an operator symbol such as the equal sign may be complemented by a rollover tooltip such as "Equivalent".

Two other search operators that a search engine may use are quoting for exact phrases and bracketing. In the present invention the system interprets a bounded term (FIG. 11) as an exact phrase. If the user does not want an exact phrase, the user may enter each word (or other text) individually, so that each one is bound separately.

Other methods may be available to users, who may not want to separate text in this way. For example, a punctuation mark that does not serve as a boundary delimiter, such as a comma, may be used:

rain, jacket, red, green

In some cases, the user may want to indicate an exact phrase within a term that contains other words that are not part of the exact phrase. To do so, in the term's boundary shape the user may enter brackets enclosing the exact phrase from the other text. For example,

[rain jacket] red, green

It should be understood that these examples are representative of the methods the present invention may use and that additional or different textual or graphical means may be applied by one who is skilled in the art.

Assembling the Search

In the present invention, the system may use search-engine specific symbols and syntax rules. This enables the system to work correctly with any search engine that supports symbolic searches. The system assembles searches by applying the symbols and syntax of the search engine to the terms and categories entered by the user.

Figure 12:
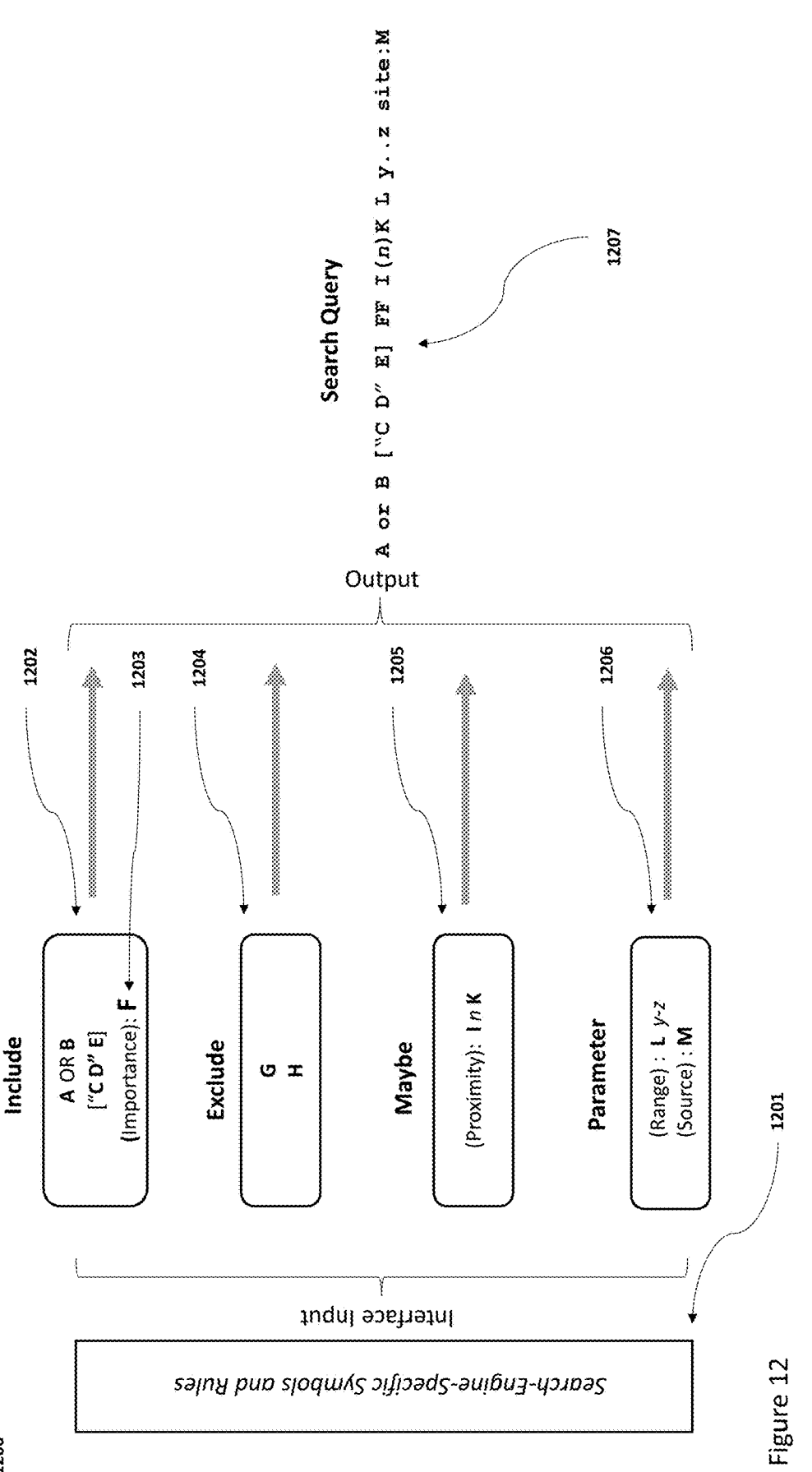
FIG. 12 illustrates the system for serializing the interface's user input into the output of a syntactically correct search.

When the interface receives user input, the system FIG. 12 applies an interchangeable search-engine-specific set of symbols and syntax rules 1201 to the input before outputting the search 1207.

The system's assembly method consists of using the interface categorization of terms to associate the search-engine-specific symbols using its syntax rules to the search terms according to their categories, and then concatenating the terms in a text string (using ordering of elements if necessary) to form as output a syntactically correct search.

Categories correspond with their associated logical operators, search operators, and search parameters, or none of these. The system, as previously described, permits various operators and parameters to be associated inline with terms within a category. In the example presented in FIG. 12, logical operator Include 1202 contains an inline search operator Importance F. For purposes of assembly, Importance may be applied to the containing category only. In the case of Maybe, Proximity I n K may be applied to all categories. This may require separate syntactical logic regardless of specific search-engine syntax.

The present invention may perform the assembly of the plain-text user input into its output format as the search by using standard string manipulation such as regular expressions. As an alternative, it may first convert input into a format such as binary code for data manipulation and/or as a preferred storage data format, then convert it back to the original format for the search to be executed by the search engine.

The storage medium may be on the same device as the system, on a network of some kind, or remotely on an internet storage facility. Every storage location may require encryption for the user's privacy. The benefit of remote storage is accessibility of search history on other devices, such as when switching between a desktop to mobile device.

References - Patent

| Publication Number | Priority Date | Publication Date | Assignee | Title |
|---|---|---|---|---|
| US20100005066A1 | Jun. 30, 2009 | Jan. 7, 2010 | None | System and methods for the retention of a search query |
| US8566351B2 | Jan. 28, 2011 | Oct. 22, 2013 | Hitachi Ltd | System and program for generating boolean search formulas |
| US9507803B2 | Oct. 18, 2011 | Nov. 29, 2016 | Microsoft Technology Licensing LLC | Visual search using multiple visual input modalities |
| CN103176970B | Dec. 20, 2011 | May 29, 2018 | None | A kind of search method and searching system |
| KR101950529B1 | Feb. 24, 2012 | Feb. 20, 2019 | None | Methods for electronic document searching and graphically representing electronic document searches |
| CN103514299B | Oct. 18, 2013 | Apr. 17, 2018 | None | Information search method and device |
| AU2014367225B2 | Dec. 19, 2013 | Dec. 8, 2016 | Facebook Inc. | Generating recommended search queries on online social networks |
| US10762123B2 | Sep. 30, 2014 | Sep. 1, 2020 | Rovi Guides Inc. | Systems and methods for searching for a media asset |
| US10025819B2 | Nov. 13, 2014 | May 19, 2016 | Adobe Inc. | Generating a query statement based on unstructured input |
| US20200050695A1 | Aug. 8, 2018 | Feb. 13, 2020 | Brane Inc | Navigation platform for performing search queries |

References - Non-Patent

Design a Perfect Search Box
https://uxplanet.org/design-a-perfect-search-box-b6baaf9599c
Designing The Holy Search Box: Examples And Best Practices
https://www.smashingmagazine.com/2008/12/designing-the-holy-search-box-examples-and-best-practices/
EBSCO Connect
https://connect.ebsco.com/s/article/Searching-with-Boolean-Operators?language=en_US
Google Advanced Search
Phone and desktop (https://www.google.com/advanced_search)
How to build a great search box
https://medium.com/@samdutton/how-to-build-a-great-search-box-2b9a6d1dce0d
IEEE research paper: A New Graphical Interface For Web Search Engine
https://ieeexplore.ieee.org/document/4373925
Improving web search transparency by using a Venn diagram interface
https://www.semanticscholar.org/paper/Improving-web-search-transparency-by-using-a-Venn-Langer-Fr%C3%B8kj%C3%A6r/8082edb449f7a4fea6905fab34fa149781d4cb26/figure/0
Open Flutter Project: Product filters in E-commerce App
https://medium.com/@openflutterproject/open-flutter-project-product-filters-in-e-commerce-app-ef62efcc019f
Search Suggestions with Interactive Visualization
https://www.researchgate.net/figure/Screenshot-of-EBSCOHosts-Visual-Search_fig6_238729333
StackExchange - Forum discussion: Intuitive interface for composing Boolean logic.
https://ux.stackexchange.com/questions/1737/intuitive-interface-for-composing-boolean-logic
UI Patterns For Mobile Apps: Search, Sort, And
Filterhttps://www.smashingmagazine.com/2012/04/ui-patterns-for-mobile-apps-search-sort-filter/
Visual Search
http://doc.mlasolutions.com/m5_user_guide/visual_search_1_print.htm
Visualizing Keyword Searches Using the Venn Diagram
http://www.jait.us/uploadfile/2015/0512/20150512110752852.pdf
YouTube Advanced Filter
Phone and desktop (https://www.youtube.com/results?search_query)

What is claimed is:

1. A method for performing a syntactically optimized web search, the method comprising:

a. providing, for display, a region containing a predetermined area;

b. receiving one or more terms input from a user into the region or outside the region, said terms comprising words, phrases, or other data representable as text, and said terms being displayed with or without containing shapes or boundaries surrounding the terms;

wherein a distance between any one of the terms and the predetermined area determines an importance of the term in the web search, such that a first term closer to the predetermined area is more important than a second term farther from the predetermined area than the first term;

wherein any term located outside the region is to be excluded from the web search;

c. receiving a move input from the user, and moving said terms inside the region, outside the region, from the region to outside the region, or from outside the region into the region, according to the move input;

d. assembling the user's input using a location of each term with respect to the distance of the one or more terms from the predetermined area and using a presence of each term within the region and outside the region, to apply a set of syntax rules to said terms to output a syntactically correct web search instruction;

wherein the assembling occurs in real time or by a user instruction for the search to be executed.

2. The method of claim 1, wherein the predetermined area is a center of the region.

3. The method of claim 1, comprising providing an input area that is delineated and separate from the region, wherein receiving one or more terms comprises:

receiving the one or more terms into the input area;

displaying the one of more terms received in the input area;

receiving a movement input to move each of the one or more terms from the input area to the region or outside the region;

moving the one or more terms, according to the movement input.

4. The method of claim 1, wherein:

receiving the one or more terms further comprises: receiving from the user a proximity input between at least one pair of the terms, the proximity input being indicative of a maximal desired distance between the terms in the pair in a predetermined or selectable count unit;

assembling the user's input further comprises assembling a web search instruction specifying the maximal desired distance in the predetermined or selectable count unit between the terms in the pair.

5. The method of claim 4, wherein receiving the proximity input comprises:

receiving a selection of the terms in the pair from the user;

displaying a line between the selected terms of the pair;

displaying a number associated with the line, the number being indicative of the maximal desired distance in the predetermined or selectable count unit;

receiving an input to change the number from the user.

6. A method for performing a syntactically optimized web search, the method comprising:

a. providing, for display, a computer-implemented graphical user interface divided into visually delineated input areas, wherein each input area is a categorical input area and is identified by a respective graphical or labeled element that indicates a category for a user to specify a web search;

wherein the categories comprise logical operators;

wherein the input areas comprise at least: a first input area associated with a first logical operator, a second input area associated with a second logical operator, a third input area associated with a third logical operator;

b. receiving one or more terms input from a user into at least one of said input areas of said categories, said terms comprising words, phrases, or other data representable as text, and said terms being displayed with or without containing shapes or boundaries surrounding the terms;

wherein the first logical operator is a requirement operator, such that any of the terms received into the first input area are required to be used in the web search;

wherein the second logical operator is a maybe operator, such that any of the terms received in the second input area are terms that are optional in the web search, and are not to be excluded from the search;

wherein the third logical operator is an exclusion operator, such that any of the terms received in the third input area are terms that are to be excluded from the web search;

c. receiving a move input from the user, and moving said terms between input areas corresponding to different categories or into an area that does not correspond to a category, according to the move input;

d. assembling the user's input using said logical operators, to apply a set of syntax rules to said terms to output a syntactically correct web search instruction;

wherein:

the assembling occurs in real time or by a user instruction for the search to be executed;

receiving the one or more terms further comprises: receiving a proximity input between at least one pair of the terms from the user, the proximity input being indicative of a maximal desired distance between the terms in the pair in a predetermined or selectable count unit;

assembling the user's input further comprises assembling a web search instruction specifying the maximal desired distance between the terms in the pair in the predetermined or selectable count unit.

7. The method of claim 6, wherein:

the categories further comprise one or more search parameters, wherein each of the search parameters is an attribute related to at least one of the search terms input into the first and second input areas, and is configured to be applied to the at least one of the search terms to limit results of the search;

the input areas further comprise one or more fourth input areas associated with respective parameters;

receiving the one or more terms further comprises receiving one or more terms in the one or more fourth input areas;

assembling the user's input comprises assembling the user's input using the logical operators and the search parameters, to apply the set of syntax rules to the terms to output the syntactically correct web search instruction.

8. The method according to claim 6, wherein the input areas are represented by one or more sets of interchangeable shapes.

9. The method of claim 8, wherein the shapes comprise any of: quadrants, circles, spheres, Venn diagrams, and expandable/collapsible lists.

10. The method according to claim 6, wherein:

the categories further comprise one or more global and persistent operators that comprise means for filtering and focusing, to enable the user to select from a collection of searchable information what information is to be restricted or expanded, by:

(i) excluding and including sources of information;

(ii) excluding and including a category of information;

the input areas further comprise one or more fifth input areas associated with respective global and persistent operators;

receiving the one or more terms further comprises receiving at least one user selection of the global and persistent operators in the one or more fifth input areas;

assembling the user's input comprises assembling the user's input using the search operators and the global and persistent operators, to apply the set of syntax rules to the terms to output the syntactically correct web search instruction.

11. The method of claim 6, comprising:

using a search engine to execute the web search instruction as the user enters terms, or by explicitly applying the web search instruction from said interface, or from the search engine itself after generating the web search instruction.

12. The method of claim 6, wherein receiving the proximity input comprises:

receiving a selection of the terms in the pair from the user;

displaying a line between the selected terms of the pair;

displaying a number associated with the line, the number being indicative of the maximal desired distance in the predetermined or selectable count unit;

receiving an input to change the number from the user.

13. The method of claim 6, comprising providing an initial input area, wherein receiving one or more terms comprises:

receiving the one or more terms into the initial input area;

displaying the one of more terms received in the initial input area;

receiving a movement input to move each of the one or more terms from the initial input area to a respective one of the categorical input areas;

moving the one or more terms into the respective categorical areas, according to the movement input.

* * * * *